Sept. 10, 1929.    H. W. BELL    1,727,804
FLEXIBLE CONNECTION FOR MOTOR VEHICLES
Filed Oct. 23, 1922    3 Sheets-Sheet 2
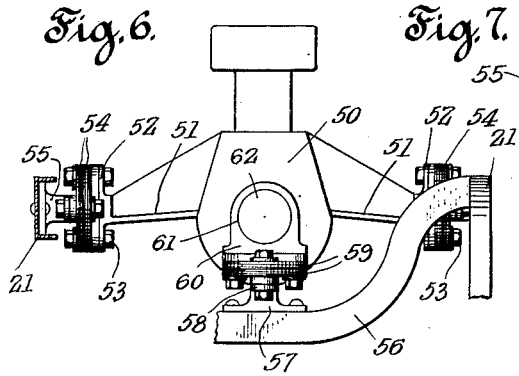
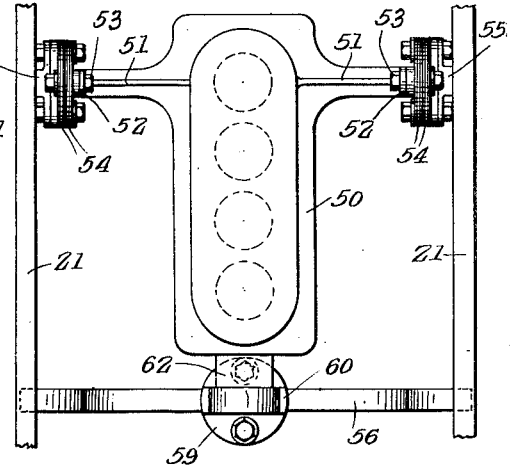
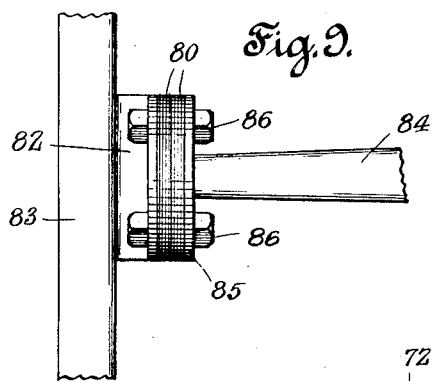
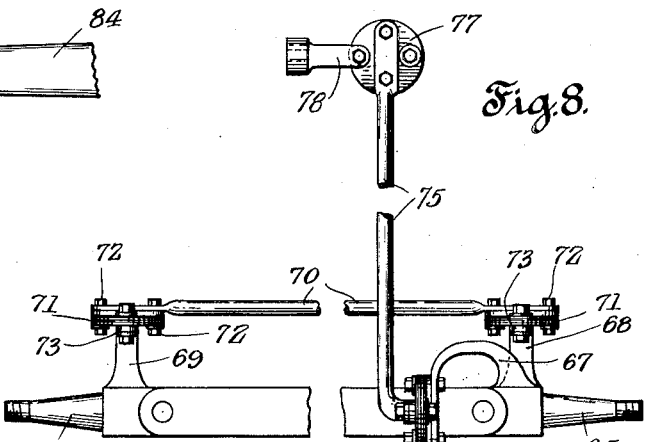
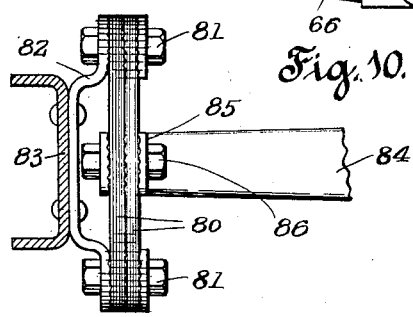
INVENTOR
Harvey W. Bell
BY E. W. Marshall
ATTORNEY Sept. 10, 1929.   H. W. BELL   1,727,804
FLEXIBLE CONNECTION FOR MOTOR VEHICLES
Filed Oct. 23, 1922   3 Sheets-Sheet 3

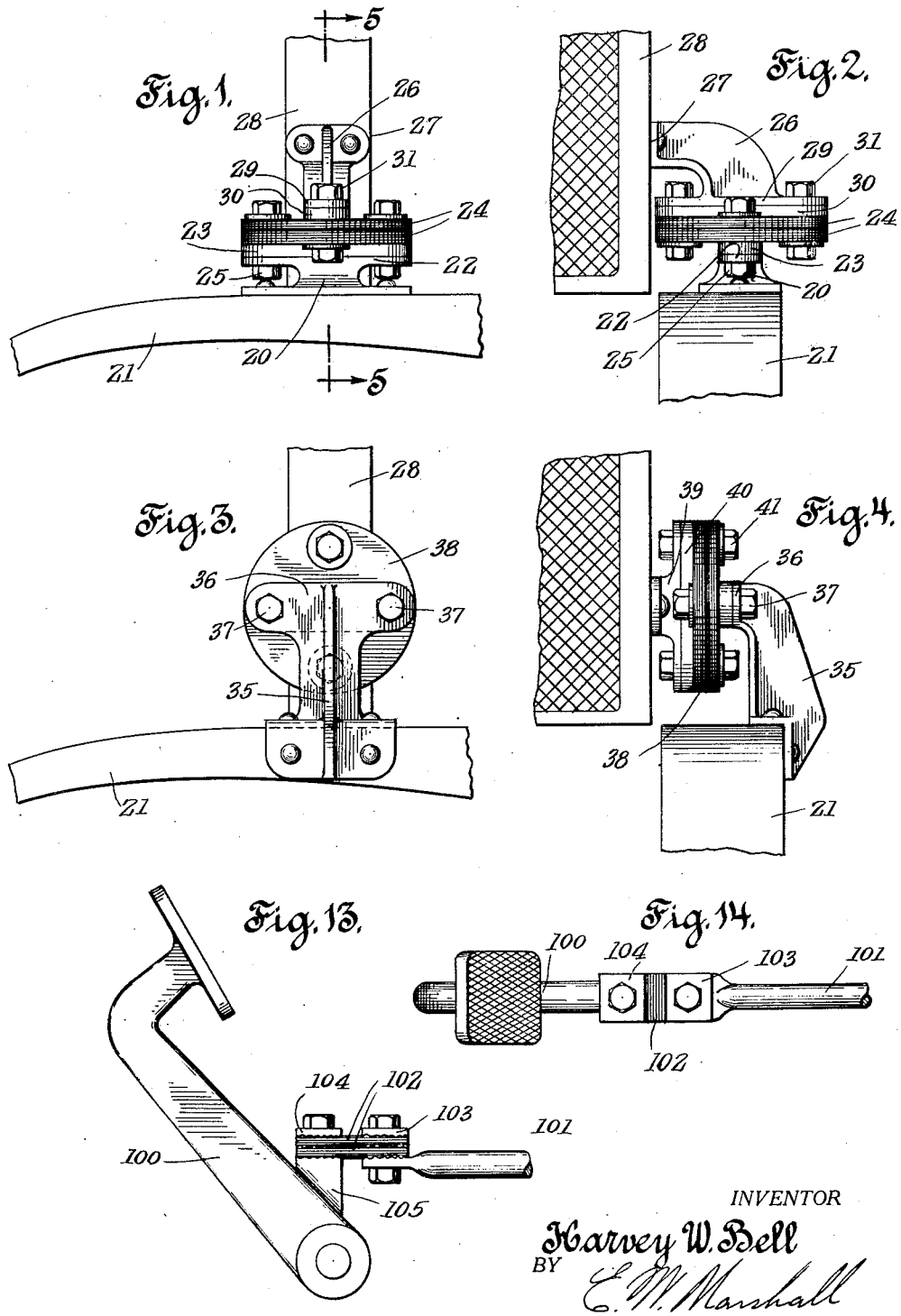

INVENTOR
Harvey W. Bell
BY
E. W. Marshall
ATTORNEY

Patented Sept. 10, 1929.

1,727,804

UNITED STATES PATENT OFFICE.

HARVEY W. BELL, OF ARDSLEY-ON-THE-HUDSON, NEW YORK, ASSIGNOR TO THE BELOYT CORPORATION, OF DOVER, DELAWARE, A CORPORATION OF DELAWARE.

FLEXIBLE CONNECTION FOR MOTOR VEHICLES.

Application filed October 23, 1922. Serial No. 596,250.

This invention relates to flexible couplings or connections and particularly to devices for use in connecting parts of a motor vehicle or vehicle chassis where it is desirable to provide for a limited relative movement between the connected parts.

It is well known that, due to the unusual strains and stresses to which a motor vehicle chassis is subjected, it is desirable to permit a limited relative movement between various parts thereof. For instance in some cases the engine casing and radiator casing have been pivotally connected to the chassis frame. Also many other pivotal connections are common in vehicle construction, such as the torque arm connection and steering knuckle connections, and so on.

All such connections require lubrication and become worn and loose through long and severe use to which they are subjected.

This invention has for its object to provide a connection between such parts that will allow the necessary freedom of movement but will be noiseless in operation and will require no lubrication or other special attention.

Another object of the invention is to provide a flexible connection of the character described so constructed that the connection will be strongly resistant to lateral pressure but will permit the necessary freedom of movement in the direction transverse thereto.

Another object of the invention is to provide a connection between vehicle parts that will absorb vibrations.

Another object of the invention is to provide a connection that will be simple, strong, durable and lasting in construction and that can be economically manufactured and will add to the life of the vehicle.

Further objects of the invention will appear from the following description taken in connection with the drawings which form a part of this application and in which, Fig. 1 is a side elevation of a portion of a vehicle chassis or frame showing a flexible connection between the frame and a radiator casing.

Fig. 2 is a front elevation of the construction shown in Fig. 1 taken at substantially right angles thereto.

Fig. 3 is a view similar to Fig. 1 but showing another form of flexible connection between the frame and radiator casing.

Fig. 4 is a front elevation of the construction shown in Fig. 3.

Fig. 6 is a front elevation of a motor showing flexible connections between the motor casing and vehicle frame.

Fig. 7 is a top plan view of the construction shown in Fig. 6.

Fig. 8 is a top plan view showing a part of the steering knuckle connections of a motor vehicle, these connections consisting of flexible couplings constructed in accordance with the invention.

Fig. 9 is a top plan view showing a flexible connection between the torque arm and the vehicle frame.

Fig. 10 is an elevational view taken at right angles to Fig. 9.

Fig. 13 is an elevational view of one of the control pedals of a motor vehicle showing the flexible connections between the pedal and a rod connected thereto.

Fig. 14 is a top plan view of the structure shown in Fig. 13.

Figure 11:
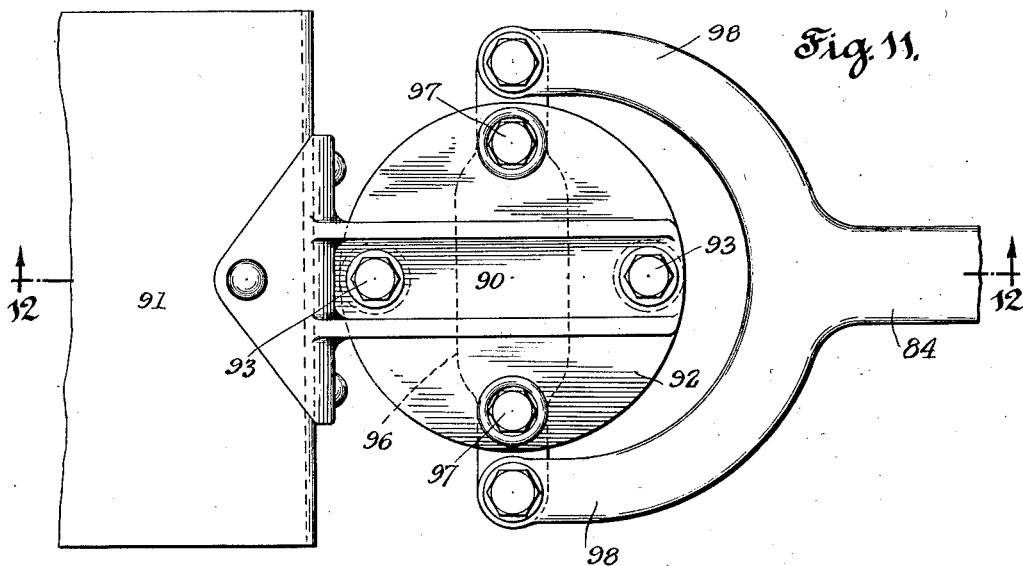
Fig. 11 is a top plan view of another form of flexible connection between the torque arm and vehicle frame.

The invention briefly described, consists of a flexible connection adapted for use in connecting two parts between which a limited amount of relative movement is desired and the connection comprises a link or member of flexible material strongly resistant to lateral pressure but yieldable in a direction transverse thereto. In most of the embodiments of the invention this link is rigidly connected at opposite points to one of the members and is rigidly connected intermediate the first mentioned points to the other member. The link is preferably formed of any suitable flexible material such as fabric belting or other material having the property of being freely flexible in a direction transverse to its plane and strongly resistant to flexure in its own plane. In another embodiment of the invention members formed of flexible material are rigidly secured at opposite ends to the elements to be connected.

Referring first to the embodiment of the invention shown in Figs. 1–5 inclusive, there is illustrated a flexible connection between a body, namely the radiator casing, and a vehicle frame. This connection comprises a bracket 20 which is riveted or otherwise secured to the frame 21 and has an upper surface 22 extending substantially parallel to and longitudinally of the frame. In the particular embodiment of the invention shown in Figs. 1 and 2 a clamping plate 23 is superimposed on the upper surface 22 of the bracket 20 and a pair of discs 24 is mounted on the clamping plate. These discs are rigidly secured at opposite points or portions by bolts 25 to the clamping plate and bracket 20. In Figs. 1 and 2 a bracket 26 is secured at 27 to the radiator casing 28 and at its opposite end has an elongated portion 29 extending transversely with reference to the frame 21 of the vehicle. A clamping plate 30 is positioned adjacent the portion 29 of the bracket 26 and the clamping plate and bracket are secured to the discs 24 by means of bolts 31 which extend through the clamping plate and discs. As clearly shown in Fig. 1 the bracket 26 is disposed substantially at right angles to the bracket 20 and is secured to the discs 24 at intermediate portions thereof and between the end portions which are secured to the bracket 20. With the construction shown in Figs. 1 and 2 the normal load due to the weight of the radiator places the fabric discs under compression. All lateral stresses and stresses longitudinally of the vehicle frame place the fabric discs or members under tension. In other words the vertical load is taken by the compression of the fabric connection and horizontal loads are taken by the tension of the connection.

Figure 5:
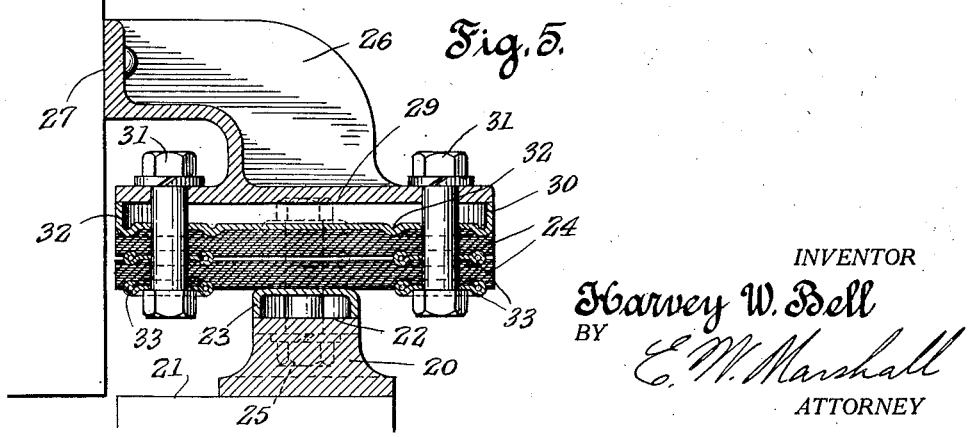
Fig. 5 is an enlarged sectional elevation showing the flexible connection between the radiator casing and vehicle frame.

In Fig. 5 the details of the connection just described are illustrated and from this showing it will be seen that the clamping plates 23 and 30 are preferably formed of sheet metal and are provided with depressed portions 32 adapted to press into the material of the discs and insure a firm clamping effect. In this figure also are shown washers 33 adapted to increase the gripping action and the rigidity of the connection between the discs and the clamping plates and brackets.

Although the particular details of the flexible connection have been illustrated in connection with the form of the invention shown in Figs. 1 and 2, these same structural details are also preferably used in the connections shown in Figs. 3, 4, 6, 7 and 8.

In Figs. 3 and 4 there is illustrated another form of connection between the radiator casing 28 and the frame 21. In this form of the invention the vertical load places the fabric connection under tension and the horizontal or lateral load places the fabric under compression. In the connection shown in Figs. 3 and 4 the bracket 35 extends upwardly from the frame 21 and has a transverse clamping portion 36. The portion 36 of the bracket is secured by bolts 37 to a pair of flexible discs 38 at diametrically opposite points thereon.

A bracket 39 having a clamping portion 40 is secured by bolts 41 to the discs at diametrically opposite points located intermediate the points of connection of the bracket 35 of the discs.

In both forms of radiator connection with the frame illustrated in Figs. 1 and 5, it will be evident that the connection will permit a limited amount of relative movement between the casing and the frame.

In Figs. 6 and 7 there is shown means for flexibly connecting another body, namely a motor casing, to a vehicle frame. The motor casing 50 is provided with laterally extending flanges 51, each of which has formed thereon a clamping portion 52 illustrated as extending substantially vertically. The portions 52 of the flanges are secured at their ends by bolts 53 to diametrically opposite points on discs 54 of flexible material. The discs 54 are also secured at points intermediate the points of connection of the discs to the clamping portions 52 to opposite ends of a bracket 55 connected to the vehicle frame members 21. The details of the connections between the brackets and discs and between the motor casing and discs are similar generally to those shown in Fig. 5.

The connections or supports of the motor described above are disposed in opposed relation, the supports at the opposite sides being so spaced and arranged that the crossed members at the left of the motor may be caused to bear against each other through the flexible discs to positively limit movement of the motor toward the left, and the corresponding elements at the right of the motor may act in a similar manner to limit movement of the motor toward the right. This arrangement enables the motor to vibrate without transmitting vibration to the vehicle frame to an objectionable degree.

In addition to the connections between the flanges 51 of the motor casing and the frame, the casing is also connected to a cross frame member 56 by a flexible connection. This connection comprises a bracket 57 secured to the cross frame member and having a clamping portion 58 rigidly connected to a pair of discs 59 at diametrically opposite points thereon and a bracket 60 rigidly connected to the discs intermediate the connections between the discs and the bracket 57. The bracket 60 is secured as shown at 61 to a lug 62 formed on the motor casing. It will thus be seen that the motor casing 50 is flexibly connected to the frame at three points, namely at one end to a cross frame member and at opposite points at the opposite end to the longitudinal frame members.

In the motor support the normal load due to the weight of the motor exerts a tension on the side connections and a compression on the end connection. Any side thrust or lateral stress of the motor casing is carried by compression of the side connections.

The mountings thus far described have been illustrated in connection either with the radiator or motor casing. It will be understood, however, that the invention may also be applied for mounting other parts or bodies on the vehicle frame.

In Fig. 8 there is illustrated the use of a flexible connection between the various parts of the steering knuckle connections of a vehicle. In this figure the wheel axles or spindles for the steering wheels are shown at 65 and 66, one of these members, 65, having formed thereon a steering knuckle arm or member 67. The member 65 also has formed thereon or secured thereto an arm 68 connected to a corresponding arm 69 at the opposite side of the vehicle by a rod 70. The connections between the arms or brackets 68 and 69 and the rod 70 include discs 71 of flexible material connected at diametrically opposite points by bolts 72 to the end portions of the rod 70 and at points intermediate the connections 72 to clamping portions 73 of the arms or brackets 68 and 69. In other words the discs are rigidly secured at diametrically opposite points to the rod 70 and at intermediate points to the brackets or arms 68 and 69.

The connections between the steering knuckle member 67 and the steering mechanism of the vehicle include a rod 75 connected by a flexible connection 76 similar to those just described to the knuckle member 67 and connected at its opposite end by a flexible connection 77 to a member 78. The member 78 is connected in the usual manner to a vehicle steering mechanism.

It will thus be seen that a plurality of flexible connections of the character described may be utilized to advantage in the steering knuckle connections of a vehicle and in this use the type of flexible connection described is particularly advantageous since the steering knuckle connections are subjected to dust and dirt and require constant lubrication and care in order to work efficiently. In the form of connection illustrated and described, however, dust and dirt are not detrimental to the effective operation of the connections and no lubrication is required.

Figs. 9 and 10 illustrate one form of simple and effective means for connecting a vehicle torque arm to the frame. In this form of the invention a pair of discs 80 of flexible material is secured at their ends by bolts 81 to a bracket 82 which in turn is secured to a cross frame member 83 of the vehicle chassis. The torque arm 84 has formed thereon or secured thereto at one end a clamping portion 85 which is rigidly connected by bolts 86 to the discs 80 intermediate the connections between the discs and the bracket 82. In this connection the fabric links or discs are under tension.

Figure 12:
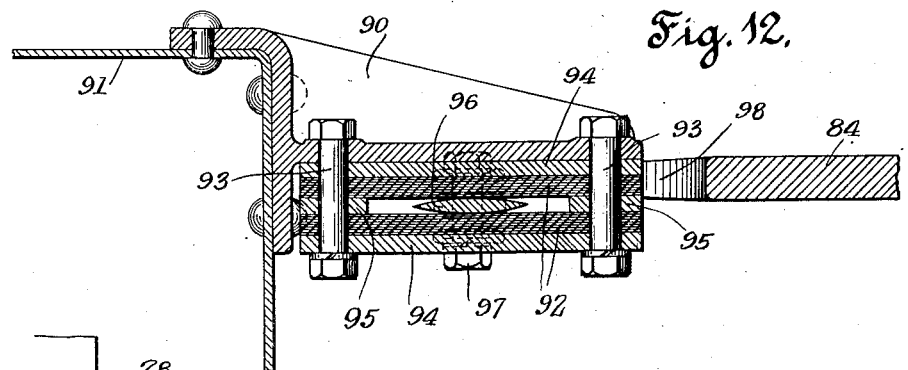
Fig. 12 is a sectional elevation taken at right angles to Fig. 11.

In Figs. 11 and 12 there is illustrated another form of flexible connection between the torque arm and the vehicle frame. In this form of connection a bracket 90 is secured to a cross frame member 91 and the bracket has rigidly connected thereto a pair of flexible discs or links 92. This connection between the discs and the bracket 90 is made by bolts 93 and includes clamping plates 94 positioned above and below the discs and spacing washers 95 interposed between the discs. The connection between the torque arm 84 and the discs includes in this instance a member 96 interposed between the discs 92 and rigidly secured thereto by bolts 97 extending through the discs and member 96. The ends of the member 96 are secured to bifurcated end portions 98 of the torque arm 84. It will be readily seen that this connection will provide the necessary flexibility between the torque arm and the frame and because of its nature the connection is admirably adapted to perform the functions required. This torque arm connection is particularly designed for use when the torque arm forms a part of the drive between the rear axle and the frame and is a tension type of connection.

Figs. 13 and 14 illustrate a simple and practical form of flexible connection between a pedal 100 and a rod 101. The connection comprises a pair of flexible strips 102 rigidly secured at their opposite ends as shown at 103 and 104 to the rod and to a lug 105 formed on or secured to the pedal 100. The pedal 100 may represent a brake pedal or clutch pedal or a lever for performing any other desired operation.

Although the connection members in most of the embodiments are illustrated and described as discs, it will be understood that these members may have any desired form or shape. The term "disc" is therefore intended to be generic and to cover all forms or shapes of flexible connecting members.

From the foregoing specification it will be seen that the flexible connection described is capable of many uses in vehicle construction and may be used advantageously for connecting relatively movable parts where a limited amount of relative movement in certain directions is desirable whereas a connection resistant to flexure in other directions is also desirable.

Although certain specific applications of the flexible connection have been illustrated and described, it will be understood that the connection is adapted for use in connecting still other parts and that changes in the construction and in the arrangement of the various parts may be made without departing from the spirit or scope of the invention as expressed in the following claims.

Features relating to the steering mechanism which are disclosed but not claimed herein, are disclosed and claimed in my pending application, Serial No. 131,143, filed August 24, 1926, for Steering mechanism for motor vehicles.

What I claim is:—

1. In combination, a vehicle frame, a body supported thereby, and vibration insulating means for mounting the body on the frame without transmitting vibrations or shocks of objectionable degree between the body and the frame, said mounting comprising opposed supports at the right and left of the body between which the body is snugly fitted, each support including a vertically disposed, longitudinally extending tension plate of flexible, inelastic, substantially inextensible, non-metallic material, on which the body is hung, and rigid connecting members on the frame and on the body respectively at opposite sides of the flexible tension plate, one of said connecting members being connected to the flexible tension plate at the upper and lower ends thereof, and the other connecting member being connected to the flexible tension plate intermediate the upper and lower ends thereof, the rigid connecting members of the left hand support being arranged to bear against one another through the flexible tension plate of said support whereby said flexible plate is caused also to serve as a compression buffer for resisting movement of the body toward the left, and the rigid connecting members of the right hand support being similarly arranged to bear against one another through the flexible plate of said support whereby said flexible tension plate is caused also to serve as a compression buffer for resisting movement of the body toward the right, the supports at the opposite sides of the body being so spaced that the body is permitted to vibrate horizontally to a very slight extent but is positively limited by the opposed supports against movements of substantial extent relative to the frame.

2. In combination, a vehicle frame, a body supported thereby, and vibration insulating means for mounting the body on the frame without transmitting vibrations or shocks of objectionable degree between the body and the frame, said mounting comprising a plurality of cushioning supports disposed in opposed relation, with the body fitted snugly between them, each support including a tension plate of flexible, inelastic, non-metallic material, and rigid connecting members on the frame and the body respectively, connected to the flexible plate at alternating separated points, which points are so disposed that any relative movement of the frame and body parallel to the plane of the flexible plate is checked by tensioning of the plate, and said connecting members of each support having bearing relation with one another through the flexible plate of such support to limit movement of the body toward such support.

3. In a motor vehicle, the combination with a frame and a motor, of vibration insulating means for mounting the motor on the frame to permit the motor to vibrate to a limited extent without transmitting vibration of objectionable degree or sharpness to the frame, said mounting comprising opposed supports between which the motor is snugly fitted, each including a plate of flexible, inelastic material and rigid members arranged at opposite sides of the elastic plate in crossed relation and normally in engagement with the plate in the crossing area and therefore in bearing relation with one another, said rigid members being connected to the frame and to the motor respectively, and each connected to the flexible plate at substantially diametrically opposite points, the points of attachment of one member alternating with those of the other so that movement in the plane of the plate is resisted in all directions with substantially equal force, each of said connecting members being connected to the flexible plate upon only a single diameter, and being sufficiently narrow to leave the plate free to flex about such diameter, the rigid connecting members of opposite supports cooperating to afford a positive check for confining lateral movement of the motor within narrow limits.

4. In a motor vehicle, the combination with a vehicle motor, of a mounting therefor comprising a support including a vertically disposed tension plate of flexible, inelastic, substantially inextensible material, and overlapping rigid members at opposite sides of the flexible plate connected to the motor and to the frame respectively and connected at spaced points to the flexible plate, said flexible plate preventing substantial vertical movement of the motor and said overlapping members co-acting through the flexible plate and utilizing the plate as a shock absorbing compression buffer to limit horizontal movement of the motor in one direction, and means cooperative with said support and disposed in opposed relation thereto for limiting horizontal movement of the motor in the opposite direction.

5. In combination, a vehicle frame, a body supported thereby, and means for mounting the body on the frame, comprising opposed supports at the right and left of the body, each support including a vertically disposed, longitudinally extending flexible plate sustaining the weight of the body under tension, and rigid frame and body members disposed to bear in part against directly opposite areas of the plate at opposite sides thereof.

6. In a motor vehicle, in combination, a vehicle frame, a body supported thereby, flexible shock absorbing compression buffers carried by the frame between the frame and opposite sides of the supported body, and means connecting the buffers to the frame and to the body in such manner that the buffers sustain the weight of the body under tension.

In witness whereof, I have hereunto set my hand this 17 day of October, 1922.

HARVEY W. BELL.